United States Patent [19]

Uchiyama

[11] Patent Number: 5,145,330
[45] Date of Patent: Sep. 8, 1992

[54] COMPRESSOR HOUSING HAVING A STRUCTURE FOR PREVENTING THE SLIPPAGE OF VIBROISOLATING MEMBERS

[75] Inventor: Yuji Uchiyama, Isesaki, Japan

[73] Assignee: Sanden Corporation, Gunma, Japan

[21] Appl. No.: 764,064

[22] Filed: Sep. 24, 1991

Related U.S. Application Data

[63] Continuation of Ser. No. 400,002, Aug. 29, 1989.

[30] Foreign Application Priority Data

Sep. 13, 1988 [JP] Japan .................. 63-119379[U]

[51] Int. Cl.$^5$ .................................. F04B 17/00
[52] U.S. Cl. ......................... 417/363; 417/53; 248/635
[58] Field of Search ............ 417/362, 363, 364, 53; 123/198 C; 248/603, 615, 635, 638; 411/108, 338, 339, 369, 542, 544, 546

[56] References Cited

U.S. PATENT DOCUMENTS

| | | | |
|---|---|---|---|
| 1,931,649 | 10/1933 | Eger | 411/544 X |
| 3,785,167 | 1/1974 | Sahs | 62/296 |
| 4,187,668 | 2/1980 | Olowinski et al. | 248/638 X |
| 4,215,841 | 8/1980 | Herring, Jr. | 248/635 |
| 4,711,135 | 12/1987 | Horiuchi et al. | 248/635 |
| 4,732,518 | 3/1988 | Toosky | 411/108 X |
| 4,834,336 | 5/1989 | Shimazaki et al. | |
| 4,938,448 | 7/1990 | Shimazaki | 248/635 |
| 4,964,786 | 10/1990 | Maertens | 417/363 |
| 4,975,008 | 12/1990 | Wagner | 411/369 |
| 4,988,071 | 1/1991 | Shimazaki et al. | |
| 4,993,682 | 2/1991 | Imai et al. | |
| 5,052,530 | 10/1991 | Shimazaki | |
| 5,052,903 | 10/1991 | Takahashi | |

FOREIGN PATENT DOCUMENTS

| | | |
|---|---|---|
| 264833 | 10/1987 | European Pat. Off. |
| 1625561 | 8/1970 | Fed. Rep. of Germany |
| 741746 | 2/1933 | France |
| 57-61252 | 12/1982 | Japan |
| 402389 | 2/1932 | United Kingdom |
| 533543 | 2/1941 | United Kingdom ........ 248/603 |
| 610955 | 10/1948 | United Kingdom |

Primary Examiner—Richard A. Bertsch
Assistant Examiner—David W. Scheuermann
Attorney, Agent, or Firm—Baker & Botts

[57] ABSTRACT

An automotive refrigerant compressor according to the present invention comprises a compressor housing that includes at least one bracket. The bracket has a hole through which a fastening member, such as a bolt for example, penetrates. A bushing, which includes a flange portion formed at one end, is inserted into the hole in the bracket with the flange portion disposed at an outer surface of the bracket. A washer-like vibroisolating member is fixed to the flange portion of the bushing by a cyanoacrylate adhesive. In accordance with this construction, the refrigerant compressor can be easily mounted within the engine compartment of a motor vehicle without having to be concerned with the conventional problem of slipping vibroisolating memers.

21 Claims, 4 Drawing Sheets

COMPRESSOR HOUSING HAVING A STRUCTURE FOR PREVENTING THE SLIPPAGE OF VIBROISOLATING MEMBERS

This application is a continuation of application Ser. No. 07/400,002, filed Aug. 29, 1989, now abandoned.

BACKGROUND OF THE INVENTION

1. Field of the Invention

The present invention generally relates to a refrigerant compressor, such as for use in an automotive air conditioning system, and more particularly, to a refrigerant compressor housing having an improved bracket structure for easier mounting of the compressor within an automobile engine compartment.

2. Description of the Prior Art

Generally, refrigerant compressors for use in automotive air conditioning systems experience a common problem when they are being mounted within the engine compartment of a motor vehicle such as an automobile. During the process of mounting the compressor to either the engine block or the body of the vehicle, washer-like vibroisolating members, which are used to prevent vibrations from the compressor from propagating into the vehicle and creating offensive noise for the passengers, are sandwiched between the compressor's mounting brackets and the vehicle. Mounting bolts are inserted through holes in the brackets and the vibroisolating members, and then fastened to either the engine or body of the vehicle. For the conventional mounting process, the vibroisolating members slip out of alignment and must be held in position by hand or with the aid of a special support jig until the bolts are fastened to the vehicle. This process is made complicated because of the restricted space within the engine compartment.

For example, a conventional automotive refrigerant compressor includes a housing that has a plurality of brackets which are used to mount the compressor to either the engine or body of the vehicle. Each bracket includes a hole through which a fastening member such as a bolt, for example, penetrates. Hereinafter, only mounting of the compressor to the engine is described, for purposes of illustration.

When the compressor is mounted directly to the engine, a washer-like vibroisolating member is inserted between the head of the bolt and the bracket, and a similar member is inserted between the bracket and the engine. Each bolt is pushed through its respective bracket and vibroisolating members, threaded into the body of the engine and then securely tightened. However, the vibroisolating members must be held in position until the bolt is threaded through the bracket, into the engine and tightened.

On the other hand, when the compressor is to be mounted indirectly to the engine, the compressor is fastened to a mounting member which is in turn mounted to the engine. In this instance, a vibroisolating member is inserted between the head of the bolt and the bracket, and a similar member is inserted between the bracket and the mounting member. Each bolt is pushed through its respective bracket, through an arm portion which is plurally formed at the mounting member to accommodate a plurality of brackets, and then threaded into a nut and tightened. In the indirect mounting process, the vibroisolating members must be held in position by hand or a support jig until the bolt is threaded into the nut and tightened.

As a consequence of having to cope with the problem of slipping vibroisolating members, the conventional process of mounting an automotive refrigerant compressor in the restricted space of an engine compartment has become difficult and time-consuming.

SUMMARY OF THE INVENTION

Accordingly, it is an object of the present invention to provide a refrigerant compressor which can be easily mounted in the engine compartment of a motor vehicle without having to cope with the problem of slipping vibroisolating members.

An automotive refrigerant compressor according to the present invention comprises a compressor housing that includes at least one bracket. The bracket has a hole through which a fastening member, such as a bolt for example, penetrates. A bushing, which includes a flange portion formed at one end, is inserted into the hole in the bracket with the flange portion disposed at an outer surface of the bracket. A washer-like vibroisolating member is fixed to the flange portion of the bushing by a cyanoacrylate adhesive.

BRIEF DESCRIPTION OF THE DRAWINGS

A more complete appreciation of the present invention and many of the attendant advantages thereof will be readily obtained as the invention becomes better understood by reference to the following detailed description when considered in connection with the accompanying drawings.

DETAILED DESCRIPTION OF THE PREFERRED EMBODIMENTS

Figure 2:
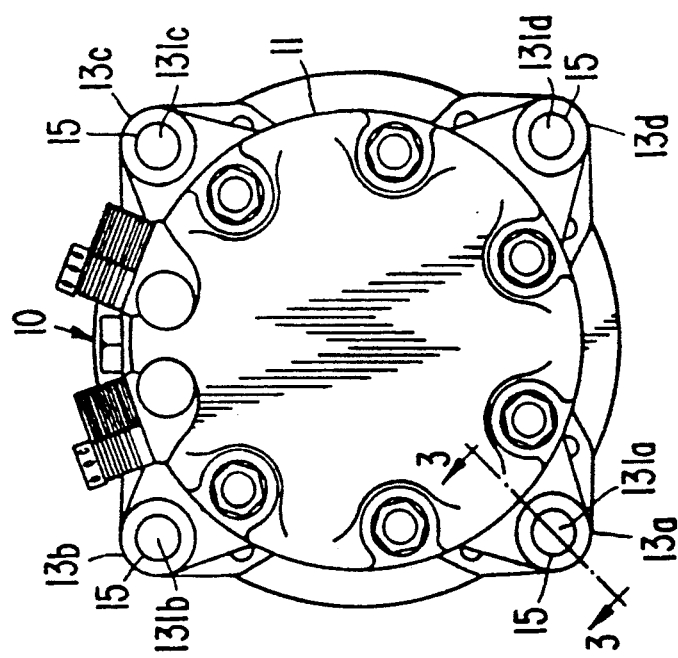
FIG. 2 is a right side view of the compressor shown in FIG. 1.
Figure 1:
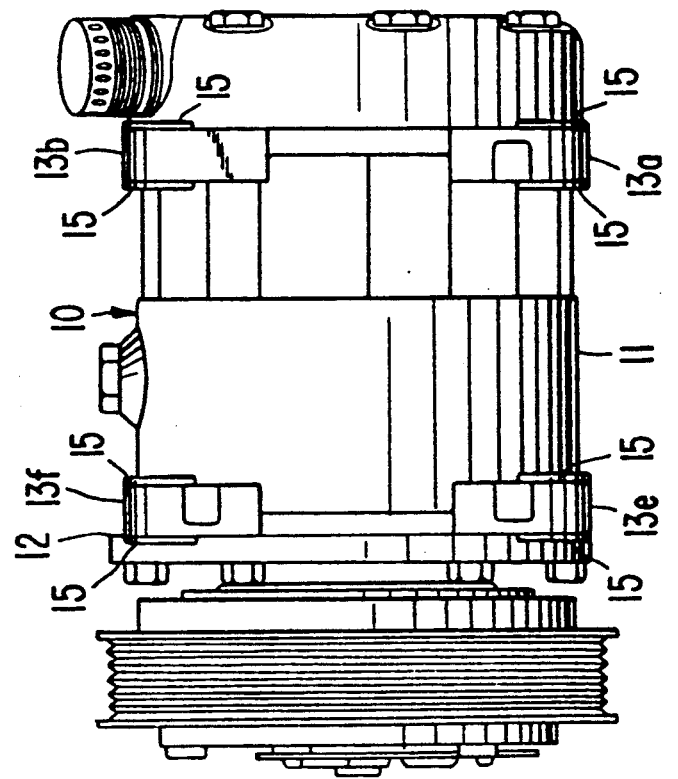
FIG. 1 is a front view of a refrigerant compressor in accordance with a first embodiment of the present invention.

FIGS. 1 and 2 illustrate a refrigerant compressor in accordance with a first embodiment of the present invention. Referring to FIGS. 1 and 2, compressor 10 includes cup-shaped housing 11, which contains the compressing and driving mechanisms (not shown), and front end plate 12 fixedly disposed at the opening (to the left side in FIG. 1) of cup-shaped housing 11. Brackets 13a–13d radially project, with a generally equal angular interval, from a near rear end (to the right side in FIG. 1) of an outer peripheral surface of housing 11. Brackets 13e–13h (only brackets 13e and 13d are shown in FIG. 1) radially project, with a generally equal angular interval, from a near front end (to the left side in FIG. 1) of an outer peripheral surface of housing 11. The angular arrangement of brackets 13e–13h corresponds to the angular arrangement of brackets 13a–13d, respectively. The eight brackets 13a–13h are similarly configured and include holes 131a–131h (only holes 131a–131d are shown in FIG. 2), respectively. Hereinafter, only bracket 13a is described, for purposes of illustration.

Figure 3:
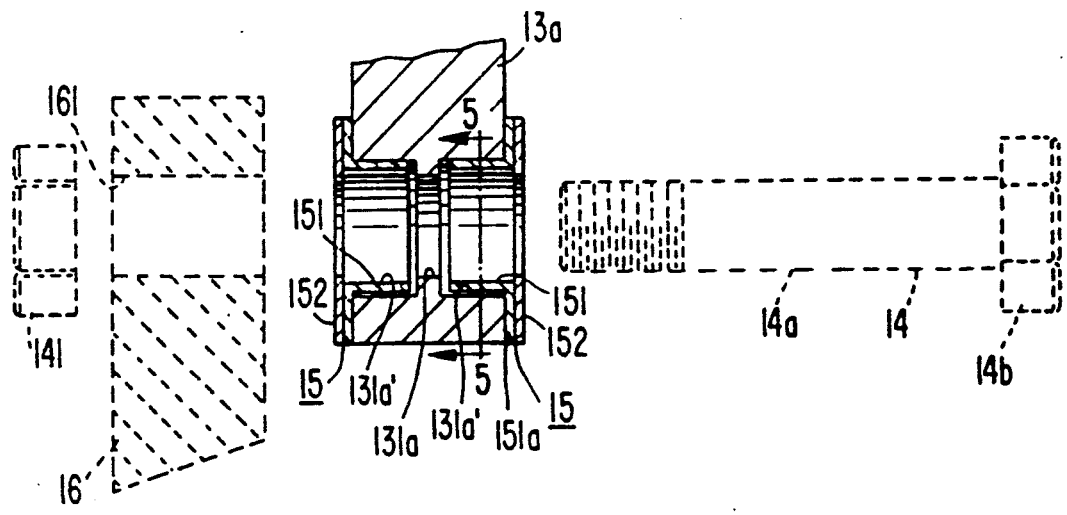
FIG. 3 is a cross-sectional view taken along line 3—3 of FIG. 2.
Figure 6:
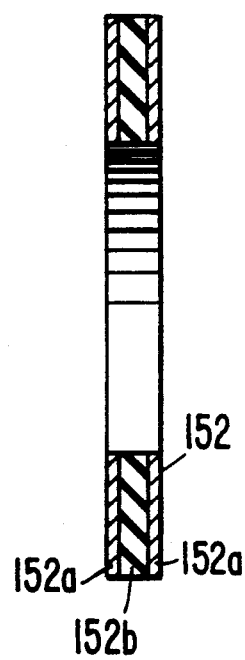
FIG. 6 is an enlarged vertical sectional view of the vibroisolating member shown in FIG. 3.

FIG. 3 is a cross-sectional view taken along line 3—3 of FIG. 2. Referring to FIGS. 1, 2, and 3, hole 131a, which includes large diameter portions 131a' formed at the openings of both ends of hole 131a, is axially bored through bracket 13a in order to pass shaft portion 14a of bolt 14 therethrough. Bracket 13a is provided with vibroisolating element 15, which includes bushing 151 and washer-like vibroisolating member 152, at both axial end surfaces thereof. Vibroisolating member 152 is fixedly disposed on an outer surface of flange portion 151a, which is formed at one end of bushing 151, by using a cyanoacrylate adhesive. A central hole of washer-like vibroisolating member 152 is aligned with a cylindrical cavity of bushing 151 so as to pass shaft portion 14a of bolt 14 through vibroisolating member 152 and bushing 151. As shown in FIG. 6, vibroisolating member 152 includes a pair of ring-shaped steel plates 152a and ring-shaped rubber plate 152b, which are fixedly sandwiched between steel plates 152a by, for example, sulfurizing adhesion. Bushing 151 is firmly inserted into large diameter portions 131a' of hole 131a until flange portion 151a makes contact with the axial end surface of bracket 13a, in order to prevent bushing 151 from slipping out of large diameter portion 131a' of hole 131a. However, if the torque from turning bolt 14 exceeds a predetermined value, bushing 151 is designed to rotate along with bolt 14 in order to prevent the separation of either vibroisolating member 152 from flange portion 151a or rubber plate 152b from steel plates 152a.

Figure 4:
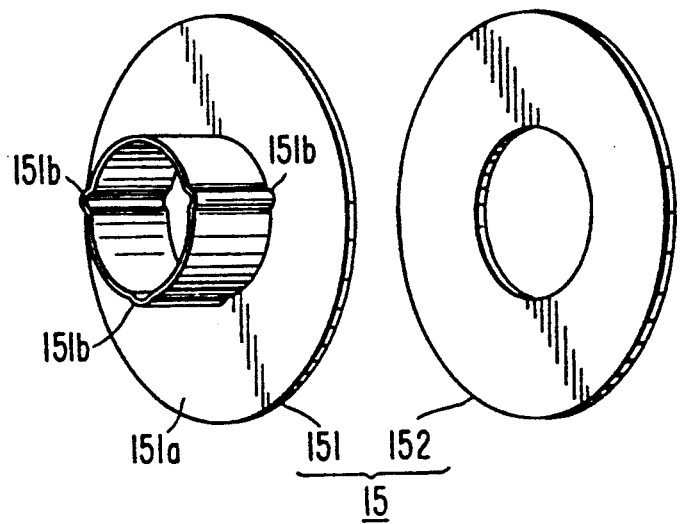
FIG. 4 is an exploded perspective view of the vibroisolating member shown in FIG. 3.
Figure 5:
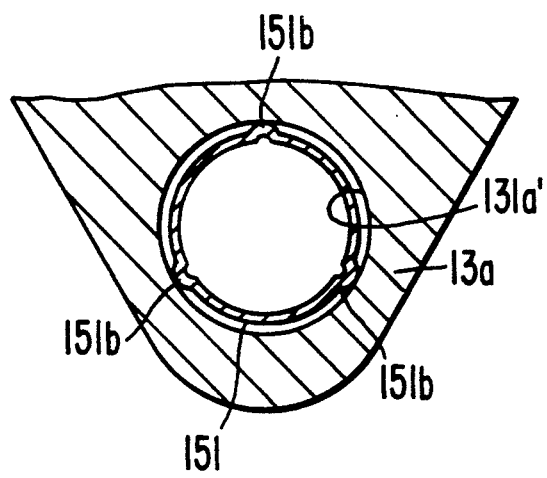
FIG. 5 is a cross-sectional view taken along line 5—5 of FIG. 3.

Referring to FIGS. 4 and 5, three axial ridges 151b are formed at an outer peripheral surface of bushing 151 with an equally angular interval so as to actively prevent bushing 151 from slipping out of large diameter portion 131a' of hole 131a. However, ridges 151b are designed to allow bushing 151 to rotate along with bolt 14 if the torque from turning bolt 14 exceeds the predetermined value.

Referring again to FIG. 3, compressor 10 is fastened to an engine (not shown) indirectly by using a mounting member (the main body of which is not shown) which is fastened to the engine as follows.

Arm portions 16 are plurally formed in the mounting member so as to correspond with brackets 13a–13h. Hole 131a of bracket 13a is aligned with hole 161 which is formed in corresponding arm portion 16. Simultaneously, each of holes 131b–131h is aligned with the corresponding hole in each of the seven remaining arm portions of the mounting member. Next, shaft portion 14a of bolt 14 is pushed through holes 131a and 161 until bolt head 14b makes contact with an outer (to the right side in FIG. 3) vibroisolating member 152. Finally, bracket 13a of compressor housing 11 is fastened to arm portion 16 of the mounting member by bolt 14 which is screwed into nut 141 and tightened.

In accordance with the above-mentioned construction of the present invention, the compressor can be more easily mounted within the restricted space of the engine compartment of a motor vehicle, without the need to be concerned with slippage of the vibroisolating members.

Figure 8:
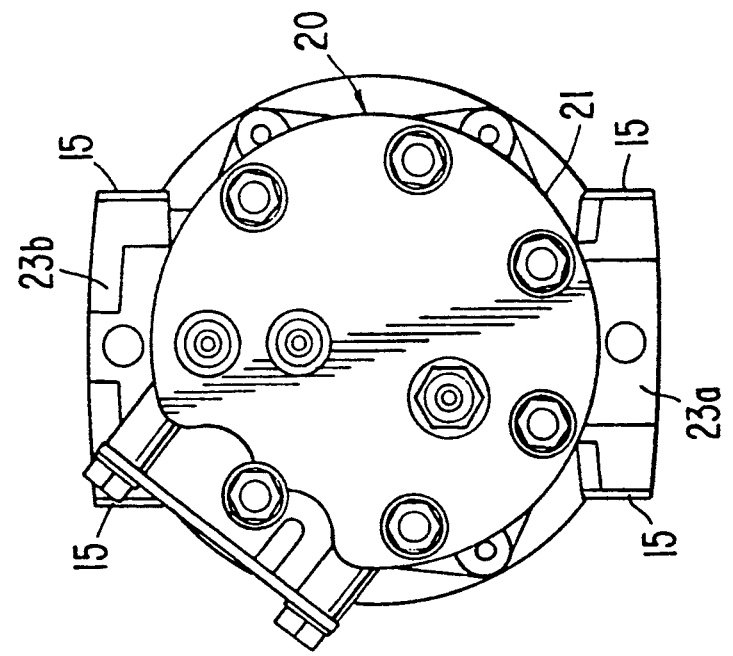
FIG. 8 is a right side view of the compressor shown in FIG. 7.
Figure 7:
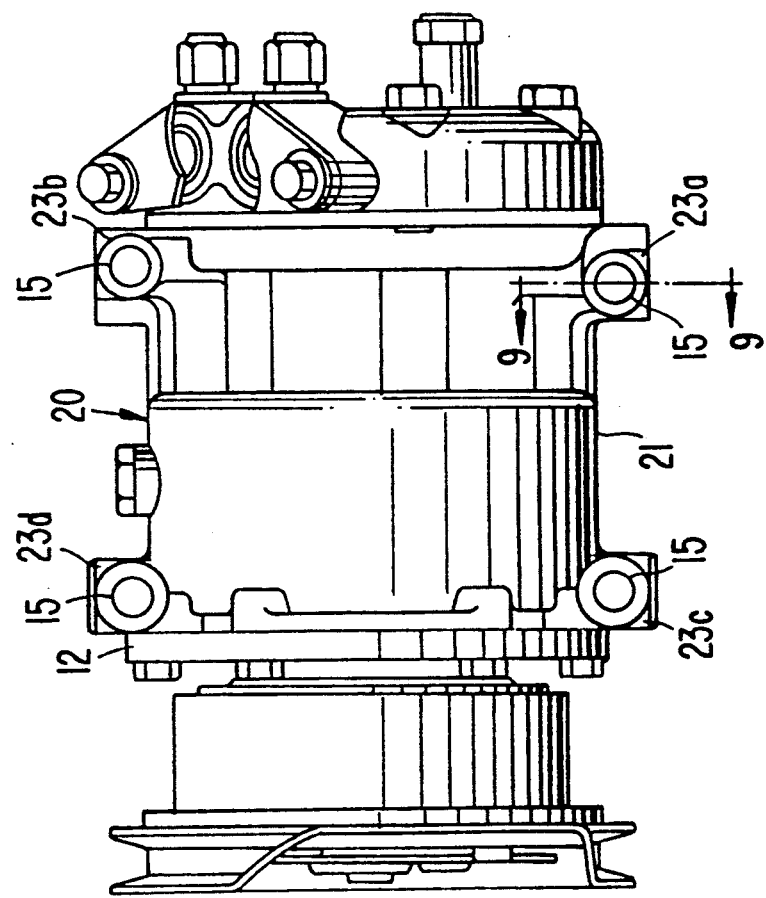
FIG. 7 is a front view of a refrigerant compressor in accordance with a second embodiment of the present invention.

FIGS. 7 and 8 illustrate a refrigerant compressor in accordance with a second embodiment of the present invention. Referring to FIGS. 7 and 8, a pair of latitudinally extended brackets 23a and 23b are formed at the near rear end (to the right side in FIG. 7) of the outer peripheral surface of housing 21 on opposing sides. Another pair of latitudinally extended brackets 23c and 23d are formed at the near front end (to the left side in FIG. 7) of the outer peripheral surface of housing 21 on opposing sides. Latitudinally extended brackets 23a–23d, which are similarly configured and positioned in parallel to each other, are used in a generally similar manner to fasten compressor 20 to either the engine or the body of the motor vehicle. Hereinafter, only bracket 23a is discussed for purposes of illustration.

Figure 9:
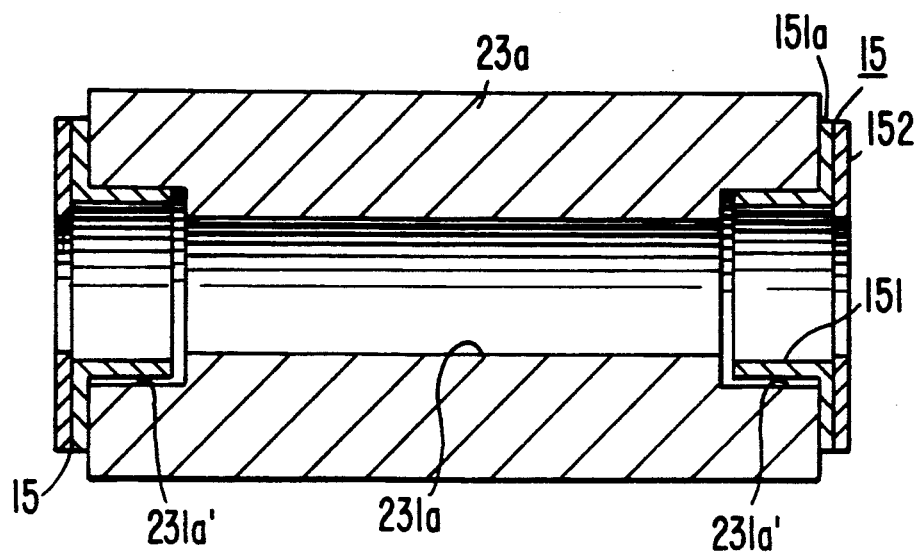
FIG. 9 is a cross-sectional view taken along line 9—9 of FIG. 7.

Referring to FIGS. 7, 8 and 9, hole 231a, which includes large diameter portions 231a' formed at the openings of both ends of hole 231a, is axially bored through bracket 23a in order to pass the shaft portion of a bolt therethrough. Bracket 23a is provided with vibroisolating element 15, which includes bushing 151 and washer-like vibroisolating member 152, at both axial end surfaces thereof. Bushing 151, which includes flange portion 151a, is inserted into large diameter portion 231a' of hole 231a until flange portion 151a makes contact with the axial end surface of bracket 23a. Vibroisolating member 152 is fixedly disposed on the outer surface of flange portion 151a by the use of the cyanoacrylate adhesive. The central hole of washer-like vibroisolating member 152 is aligned with the cylindrical cavity of bushing 151 so as to pass the shaft portion of the bolt through vibroisolating member 152 and bushing 151. In accordance with the above-mentioned construction, when compressor 20 is fastened directly to the engine or the body of the automobile, each bolt is passed through its respective bracket 23a–23d, screwed into either the engine or body of the automobile and then tightened. Since the effects of this embodiment are similar to the effects of the above-mentioned first embodiment, an additional explanation thereof is omitted.

This invention has been described in detail in connection with the preferred embodiments but is for illustrative purposes only and the invention is not limited thereto. It will be easily understood by those skilled in the art that variations and modifications can easily be made within the scope of this invention as defined by the appended claims.

I claim:

1. A compressor mount for mounting a compressor in a motor vehicle engine compartment, said compressor including a compressor housing and said engine compartment including a mounting member, said compressor mount comprising:

fastening means for fastening said compressor housing to said mounting member;

at least one bracket formed as an integral part of said compressor housing, said at least one bracket including a first opening;

a bushing disposed in the first opening of said at least one bracket, a flange portion formed at a first end of said bushing and disposed adjacent an outer surface of said at least one bracket so as to define a second opening through which said fastening means may be received therethrough; and a vibration isolating member affixed to said flange portion of said bushing such that compressor vibrations are isolated to said compressor when said fastening means is disposed within said second opening so as to fasten said compressor housing to said motor vehicle engine compartment;

wherein said fastening means comprises a bolt means, said bushing including at least one axial ridge formed at an outer peripheral surface, said at least one axial ridge allowing said bushing to rotate with said bolt means when the torque of said bolt means exceeds a predetermined value.

2. A compressor mounting system for mounting a compressor in a motor vehicle engine compartment, said compressor mounting system comprising:

a compressor housing including at least one bracket integrally formed thereon, said at least one bracket including a first opening;

a mounting member within said motor vehicle engine compartment;

fastening means for fastening said compressor housing to said mounting member;

a bushing disposed in the first opening of said at least one bracket, a flange portion formed at a first end of said bushing and disposed adjacent an outer surface of said at least one bracket so as to define a second opening through which said fastening means may be received therethrough; and a vibration isolating member affixed to said flange portion of said bushing such that compressor vibrations are isolated to said compressor when said fastening means is disposed within said second opening so as to fasten said compressor housing to said motor vehicle engine compartment;

wherein said fastening means comprises a bolt means, said bushing including at least one axial ridge formed at an outer peripheral surface, said at least one axial ridge allowing said bushing to rotate with said bolt means when the torque of said bolt means exceeds a predetermined value.

3. A compressor mount for mounting a compressor in a motor vehicle engine compartment, the compressor including a compressor housing and the engine compartment including a mounting member, said compressor mount comprising:

fastening means for fastening the compressor housing to the mounting member;

at least one bracket including a first opening, and said at least one bracket and the compressor housing being formed as a single, unitary, continuous structural piece;

a bushing disposed in said first opening of said at least one bracket, a flange portion formed at a first end of said bushing and disposed adjacent an outer surface of said at least one bracket so as to define a second opening through which said fastening means can be received; and a vibration isolating member affixed to said flange portion of said bushing such that engine compartment vibrations are isolated to the compressor when said fastening means is disposed within said second opening so as to fasten the compressor housing to the motor vehicle engine compartment.

4. The compressor mount recited in claim 3 wherein said vibration isolating member includes a pair of plate members and a relatively soft vibration absorbing element being sandwiched between said plate members.

5. The compressor mount recited in claim 3 wherein said vibration isolating member is fixedly secured to said flange portion with an adhesive.

6. A method of mounting a compressor in a motor vehicle engine compartment, said compressor including a compressor housing and having at least one bracket secured thereon, said method comprising the steps of:

inserting a bushing into said at least one bracket;

adhering a vibration isolating member to said bushing;

positioning said compressor in said motor vehicle engine compartment such that said at least one bracket is aligned with a corresponding mounting assembly;

pushing a shaft portion of a bolt through said at least one bracket until a head of said bolt contacts said vibration isolating member; and tightening said bolt to firmly secure said compressor in said motor vehicle engine compartment.

7. The method according to claim 6 wherein said bushing has a hollow sleeve portion and a flange portion, and wherein the step of adhering said vibration isolating member to said bushing includes adhering said vibration isolating member to said flange portion of said bushing.

8. The method according to claim 6 wherein the step of positioning said compressor in said motor vehicle engine compartment includes positioning said compressor such that said at least one said bracket is aligned with a corresponding mounting member.

9. The method according to claim 8 wherein said mounting member is fixedly secured in said motor vehicle engine compartment.

10. The method according to claim 6 wherein said compressor housing has a plurality of brackets, and the step of inserting said bushing in said at least one bracket includes inserting bushings into said plurality of brackets.

11. The method according to claim 6 wherein the step of adhering said vibration isolating member to said bushing includes adhering said vibration isolating member to said bushing with a cyanoacrylate adhesive.

12. The method according to claim 6 wherein said inserting step is before said adhering step.

13. The method according to claim 6 wherein said adhering step is before said inserting step.

14. The method according to claim 6 wherein said adhering step and said inserting step are before said positioning step.

15. The method according to claim 6 wherein said at least one bracket and said compressor housing form a single, unitary, continuous structural piece.

16. The method according to claim 6 wherein said at least one bracket is formed as a single, unitary, continuous structural piece with said compressor housing.

17. A compressor mount for mounting a compressor in a motor vehicle engine compartment, the compressor including a compressor housing and the engine compartment including a mounting member, said compressor mount comprising:

fastening means for fastening the compressor housing to the mounting member;

at least one bracket formed as an integral part of the compressor housing, and including an opening;

a bushing disposed in said opening of said at least one bracket, said bushing including at least one axial ridge formed at an outer peripheral surface thereof engaging an inner wall of said opening in a friction tight fit said at least one axial ridge allowing said bushing to rotate with said fastening means when the torque on said fastening means exceeds a predetermined value; and a vibration isolating member affixed to said bushing such that compressor vibrations are isolated to the compressor.

18. The compressor mount recited in claim 17 wherein said vibration isolating member includes a pair of plate members and a relatively soft vibration absorbing element being sandwiched between said plate members.

19. The compressor mount recited in claim 17 wherein said vibration isolating member is fixedly secured to said flange portion with an adhesive.

20. A compressor mount for mounting a compressor in a motor vehicle engine compartment, the compressor including a compressor housing and the engine compartment including a mounting member, said compressor mount comprising:
- at least one bracket secured on the compressor housing;
- a bushing including a sleeve portion and a flange portion, said sleeve portion being received in said at least one bracket and said flange portion abutting an outer surface of said at least one bracket; and
- a vibration isolating member including a pair of plate members and a relatively soft vibration absorbing element sandwiched between said plate members, and one of said plate members being fixedly secured to said flange portion of said bushing.

21. The compressor mount recited in claim 20 wherein said vibration isolating member is fixedly secured to said flange portion with an adhesive.

* * * * *